United States Patent [19]
Goldfarb et al.

[11] Patent Number: 5,685,244
[45] Date of Patent: Nov. 11, 1997

[54] GAS-FIRED SMELTING APPARATUS AND PROCESS

[75] Inventors: Victor M. Goldfarb, Swampscott; Jaime Woodroffe, North Reading, both of Mass.

[73] Assignee: Textron Systems Corporation, Wilmington, Mass.

[21] Appl. No.: 496,030

[22] Filed: Jun. 28, 1995

[51] Int. Cl.$^6$ ...................................................... F23G 1/00
[52] U.S. Cl. ........................................... 110/346; 110/236
[58] Field of Search .................................. 110/346, 236, 110/165 R

[56] References Cited

U.S. PATENT DOCUMENTS

| | | | |
|---|---|---|---|
| 858,325 | 6/1907 | Becket. | |
| 866,562 | 9/1907 | Becket. | |
| 1,094,114 | 4/1914 | Bleecker. | |
| 1,359,473 | 11/1920 | Goodwin et al.. | |
| 1,521,607 | 1/1925 | Dixon. | |
| 3,374,085 | 3/1968 | Stone | 75/3 |
| 3,567,428 | 3/1971 | Svensson | 75/3 |
| 3,579,328 | 5/1971 | Svelgen et al. | 75/133.5 |
| 3,637,370 | 1/1972 | Buker | 75/40 |
| 3,799,761 | 3/1974 | Breuer | 75/13 |
| 4,119,455 | 10/1978 | Cass et al. | 75/28 |
| 4,165,234 | 8/1979 | Kostyanoi et al. | 75/60 |
| 4,695,447 | 9/1987 | Shultz | 423/659 |
| 4,708,068 | 11/1987 | Hattori et al. | 110/263 |
| 4,731,112 | 3/1988 | Hoffman | 75/10.22 |
| 4,878,944 | 11/1989 | Rolle et al. | 75/25 |
| 4,960,057 | 10/1990 | Ohshita et al. | 110/245 |
| 5,127,943 | 7/1992 | Kazadi | 75/773 |
| 5,186,742 | 2/1993 | Hoffman | 75/773 |
| 5,228,398 | 7/1993 | Byerly et al. | 110/165 |
| 5,239,936 | 8/1993 | Wichner et al. | 110/245 |
| 5,353,720 | 10/1994 | Berg | 110/346 |
| 5,379,705 | 1/1995 | Takada et al. | 110/245 |
| 5,551,358 | 9/1996 | Burkhard et al. | 110/346 |

*Primary Examiner*—John T. Kwon
*Attorney, Agent, or Firm*—Perman and Green

[57] ABSTRACT

A novel smelting process and furnace for the economical recovery of vanadium, in the form of ferrovanadium alloy, from oil ashes and/or coal ashes while producing non-hazardous slag for safe and inexpensive disposal in landfill areas. A preferred embodiment of the present process involves the steps of (a) mixing the waste ashes with a contained or added carbon source, such as coal, and a binding material, such as cement; (b) pelletizing the mixture; (c) feeding the pellets, optionally together with steel scrap, through a vertical preheater shaft furnace into a slag pool; (d) impinging fuel gas jets upon the surface of the slag layer to heat and circulate the slag and to burn the carbon added to the pellets, generating additional heat, to produce a layer of molten ferrovanadium alloy at the bottom of the molten pool, covered by a protective layer of molten slag, (e) withdrawing the valuable molten ferrovanadium alloy for use, and (f) withdrawing the molten slag for safe disposal in landfill areas.

18 Claims, 1 Drawing Sheet

GAS-FIRED SMELTING APPARATUS AND PROCESS

BACKGROUND OF THE INVENTION

1. Field of the Invention

The present invention relates to the recovery of vanadium from fly ash formed in boilers fired by heavy oils or by alternate fuel heavy oil/coal systems, which ashes contain relatively high amounts of vanadium oxides, e.g., 5 to 25% by weight, as compared to ores which may contain only about 2% by weight of vanadium pentoxide. Such ashes provide a very competitive source of valuable high vanadium concentrates, alloys and vanadium metal.

The present invention is also concerned with the removal of vanadium oxides from such ashes so that the residue formed is safe for disposal in refuse sites and landfill areas. Vanadium oxides such as vanadium pentoxide are both water-soluble and toxic to humans. Therefore vanadium-containing ashes cannot be deposited in dump sites or landfill areas because of the likelihood of the vanadium oxide being dissolved from the ashes and leaching into groundwater which may contaminate sources of drinking water.

2. Description of the Prior Art

Numerous processes and apparatuses are known for the recovery of vanadium from ores and from dust waste products produced by furnaces. Reference is made to U.S. Pat. Nos. 1,094,114; 1,359,473 and 1,521,607 for their disclosures of processes for recovering or extracting vanadium from vanadium-containing ores. Reference is also made to U.S. Pat. Nos. 4,731,112; 5,127,943 and 5,186,742 for their disclosure of processes for treating ashes or dust waste to render them safe for disposal. Reference is also made to U.S. Pat. No. 4,731,112 for its disclosure of a process for producing iron alloys from iron fines containing iron, carbon and metal oxides including vanadium oxide, in which the iron fines and slag-formers are added to a melting furnace and the oxides are reduced to form a high ferroalloy melt.

SUMMARY OF THE INVENTION

The present invention relates to a novel smelting process and furnace for the economical recovery of vanadium, in the form of ferrovanadium alloy, from oil ashes and/or coal ashes while producing non-hazardous slag for safe and inexpensive disposal in landfill areas.

In essence, the present process involves the steps of (a) providing a mixture containing waste ashes and a carbon source, such as coal, optionally with a binding material, and such as cement; (b) optionally pelletizing the mixture; (c) feeding the mixture, together with steel scrap, through a vertical preheater shaft furnace into a slag pool; (d) impinging fuel gas jets upon the surface of the slag layer to heat and circulate the slag and to burn carbon present in the ash and any carbon added to the ash mixture, generating additional heat, to produce a layer of molten ferrovanadium alloy at the bottom of the molten pool, covered by a layer of molten slag, (e) withdrawing the valuable molten ferrovanadium alloy for use, for example, as a component of hard tool steel for the production of tools, and (f) withdrawing the molten slag for safe disposal in landfill areas, since it is essentially free of vanadium compounds and of significantly smaller volume and lower leachability than the starting ash materials.

Alternatively, oil or coal ash collected from a power station boiler and/or from the ash storage can be used as a feed without pelletizing. In this even, water content in the ash may be preliminarilly-reduced using the furnace exhaust gas or a separate device for drying. Ash with relatively high residual water content is "sticky" and can be top-charged into the furnace. Completely dry ash preferably is charged by a feeder terminating under the surface of the top slage layer.

THE DRAWING

FIG. 1 of the drawing is a flow sheet illustrating the various components and stations of the system and smelting furnace of the present invention.

DETAILED DESCRIPTION

Figure 1:
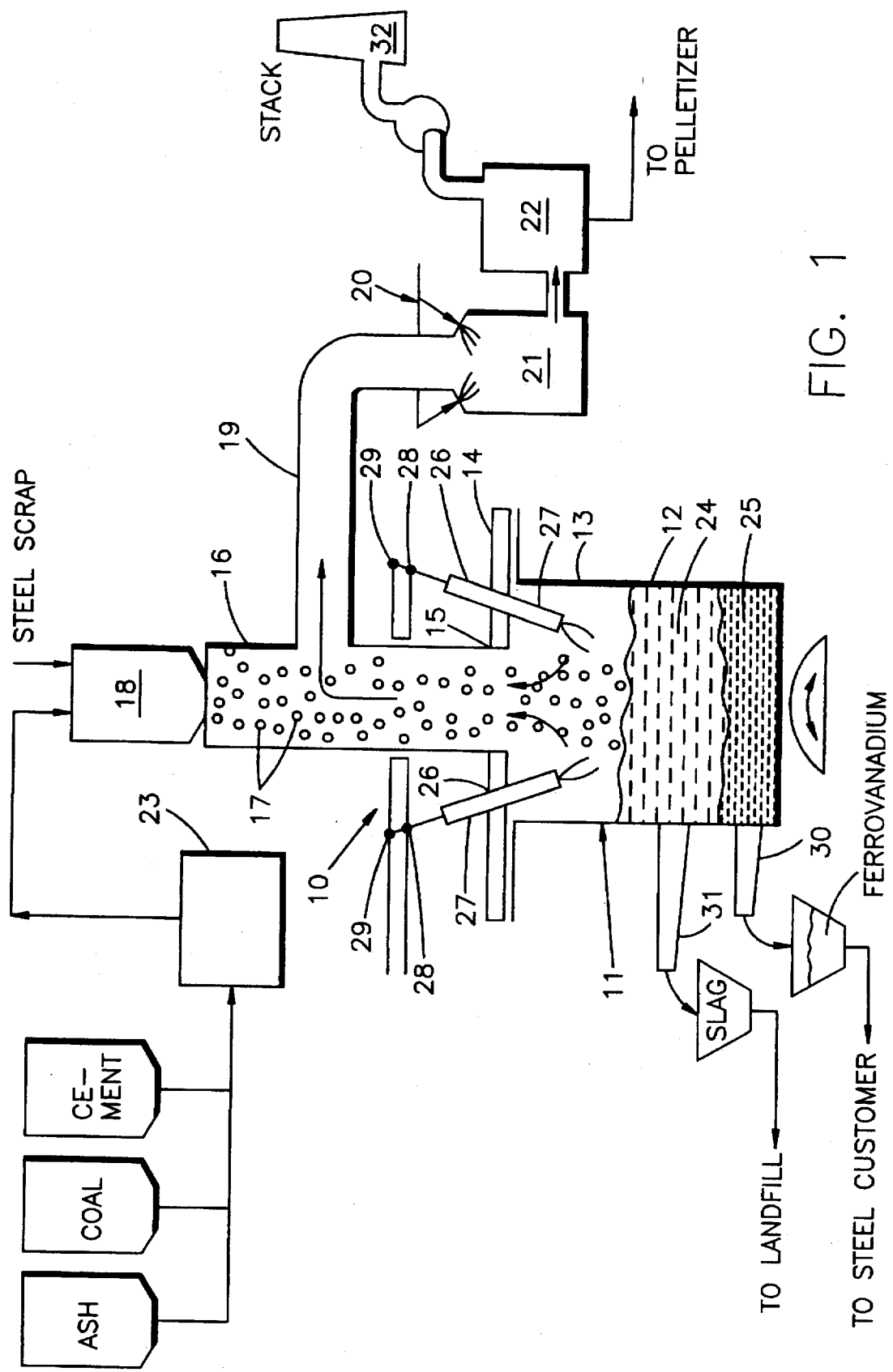

The present process is a smelting reduction process for reducing the metal oxides present in oil ash and/or coal ash, particularly vanadium oxides present in relatively large amounts in Venezuelan oils, in a smelting furnace fired by natural gas-oxygen, or natural gas —$O_2$— enriched air, while masking the molten metal layer with a thick surface layer of slag to prevent re-oxidation of the metals.

The present smelting furnace incorporates top burners in the freeboard area which direct high velocity flames against the upper surface of the slag layer to produce circulation of the slag layer, high heat transfer thereto and combustion of the carbon present in the pellets to provide a second source of heat and a reducing atmosphere for the metal oxides such as vanadium pentoxide and for the iron scraps added with the pellets or molten iron present in the pool. The molten metals descend through the slag layer and deposit in a molten pool at the bottom of the smelting chamber.

Referring to FIG. 1, the smelting furnace 10 thereof comprises a refractory base 11 having a smelting chamber comprising a lower reservoir section 12 and an upper heating space of freeboard 13 covered by a roof portion 14 having a central opening 15 communicating with the vertical shaft 16 of the furnace. The vertical shaft 16 functions as a preheater and feed inlet conduit for the mix 17 pellets and optional steel scrap introduced through the feeder 18, and as an outlet conduit 19 for hot process off-gases which provide the pellet-preheating energy as they escape up the shaft 16, against the flow of the mixed particles 17, and are withdrawn through vent conduit 19. The off-gases are sprayed with cooling water sprayers 20 at a quench station 21 and particulates are separated in a hot baghouse 22 and may be recirculated to the ash supply for the pelletizer 23 while the gases are released to the stack 32.

The pelletizer 23 is automatically supplied with predetermined proportions of ash, coal or carbon and cement to form pellets which are automatically fed at the desired rate into the feeder 18. Some fine steel scrap or iron ore may also be added to the feeder 18 to produce the desired ferrovanadium composition. The particles 17, comprising the pellets and iron scrap, if any, are gravity fed through the vertical preheating shaft 16 where they are heated by the hot off-gases as they drop through the freeboard space of the smelting chamber into the thick slag layer 24 overlying the molten metal layer 25 in the reservoir section 12 of the furnace 10.

The slag layer 24 comprises conventional fluxing agents such as calcium aluminate, lime, limestone, and silicon dioxide which are added to the smelting chamber at start-up, and thereafter as needed. Also additional slag is formed by glass-forming components of the charge, i.e., the ash and the coal. The smelting chamber preferably is cylindrical and the roof 14 thereof has a plurality of openings 26 extending therethrough, each of which supports a gas burner 27 for extension at an angle into the freeboard space 13 to exert the force of the burning gas jet against the upper surface of the molten slag layer 24, for purposes of superheating the slag layer 24 and imparting thereto a horizontal or swirling flow velocity or circulation, as assisted by the cylindrical shape of the smelting chamber. A plurality of uniformly spaced openings 26 and gas burners 27 preferably are present, each gas jet flow preferably being near sonic gas flow conditions.

Each gas burner 27 has a caloric gas inlet 28 connected to a source of fuel such as oil, natural gas or another caloric gas, and an oxidizer gas inlet 29 connected to a source of an oxidizer gas such as air and oxygen. The gas burner(s) 27 include means for mixing the fuel and gases to form a flammable mixture which is ignited as a burning gas jet emitted from burner 27 at a relatively high force.

Combustion products including mostly water vapors and carbon dioxide, carrying a significant amount of sensible heat, are released upwardly into the vertical shaft 16 to preheat the solid mix 17 of iron scrap particles and ash pellets.

The vertical shaft 16 and/or the side outlet conduit 19 can communicate with the oxygen supply to the burners, or with other heat or steam-recovery systems which utilize the normally-lost heat and/or steam and which thereby reduce the temperature to the stack and reduce the amount of lost energy. For example, the shaft 16 or conduit 19 can comprise a water jacket through which cold water is circulated to extract heat and produce steam for related or unrelated power-generation purposes.

The present process is a high temperature process which uses two sources of energy to heat the ash coal/cement pellets. The main source of energy is the energy delivered by the top-fired burners operating with natural gas or oil and oxidizer gas. The secondary source of energy is derived from the combustion or oxidation of carbon present in the ash component and present in the coal component of the pellets. The oxidized carbon produces hot combustion gases which preheat the particles 17 after heating the slag layer by carbon monoxide bubbles generated in the carbon oxidation process.

Metal oxides, including vanadium pentoxide and iron oxides, are reduced to molten metal by the carbon in the slag layer 24 and by other optional stronger reducing agents such as aluminum, if added. The molten metal gravitates to the molten metal layer 25 and the overlying slag layer 24 shields the layer 25 against oxidation by the oxidizing atmosphere of the freeboard space 13 of the furnace and by the burner jets.

As illustrated, the furnace 10, or the refractory base 11 thereof is supported to be tipped so as to drain or tap molten metal 25, through metal spout 30 for use, and/or to drain molten slag 24, through slag spout 31, for safe disposal in a landfill or other area since the heavy metal compounds such as vanadium pentoxide have been alloyed into the molten ferrovanadium metal.

The burners 27 of FIG. 1 can be supported for adjustment between different extension positions and will all be used in the same retracted or extended positions during operation. The burners 27 receive and mix natural gas or other caloric gas, through inlet 28, and an oxidizer gas such as oxygen, through inlet 29, under sufficient pressure to emit burning gas jets which exit at or impinge upon and penetrate and agitate the surface of the slag layer 24, outwardly or tangentially of the center thereof, and create a continuous movement or circulation of the slag layer at a predetermined slag flow velocity. This causes the slag layer to circulate in a vertically-inclined direction, due to the inclined downward force of the gas jets, so that the slag layer 24 is efficiently superheated by continuous movement through the areas of the melting chamber which are most directly affected by the plurality of gas jets 27. The thickness of the slag layer 24 varies depending upon the size of the furnace. Generally the slag layer is maintained sufficiently thick to prevent exposure of the metal layer 25 under the force of the gas jets and sufficiently thin to provide good circulation and more uniform temperature. A slag layer thickness of about three to five inches produces excellent results.

Each jet serves or affects an area of the slag layer 24 having a diameter about equal to the depth of the layer. Some of the generated gases react with an/or remain trapped within the slag layer, such as some of the nitrogen-oxygen pollutants, thereby reducing the discharge of pollutants to the baghouse 22 and to the stack 32. Some of the pollutants are also trapped and/or deposited on the solid pellets 17 in the vertical shaft 16 and are carried back into the furnace with the pellets 17 for re-entry into the slag layer 24. Some of the pollutants are removed from the furnace within the slag layer portions which are discharged through the slag drain spout 31. Formation of nitrogen oxides is also greatly reduced due to the low nitrogen content of the furnace gas.

In an optional efficient system of the present invention, combustion products including water vapors and carbon dioxide carrying significant amounts of sensible heat are extracted from the furnace through roof outlet 15 and can be conveyed by shaft 16 to a steam generation unit where the steam is used to power a compressor turbine to power an oxygen-producing plant and to circulate the oxygen, and air admitted thereto, through a preheater in which the oxidizer mixture is heated to about 600° C., and conveyed to the oxygen inlet 29 of the burners 27.

The furnace roof 14 preferably includes a slag inlet conduit through which fresh slag composition is introduced to the furnace 10 to replace used slag which is withdrawn and/or to introduce slag chemicals which are consumed in the refining processes, such as desulphurization.

To demonstrate the feasibility of the present invention, four hundred and fifty pounds of mixed (oil and coal) wet ash containing 15 lbs (3.3%) of vanadium pentoxide, 12 lbs (2.7%) of iron oxide, and 75 lbs (17%) carbon (all by weight, wet basis) were charged in the preheated smelter (1000 lb. capacity, 21" chamber) having a few pounds of solidified bottom steel layer 25. One hundred pounds of Ca/Al flux and limestone were added. The charge was melted running three top burners 27 and 600 to 800 kBtu/hr power at fuel-lean conditions. Due to ash-carbon combustion, the combustion products in the freeboard 13 had about 25% CO content. After a surface temperature of about 2900° F. was reached, 30 pounds of aluminum scrap were added to ensure reduction of metals from the slag 24. The melt 25 was poured in a sand mold. After cooling, 25 pounds of compact solid metal were separated from 100 pounds of slag.

EDX/SEM and chemical analysis demonstrated the following composition of the extracted metal, probably, $Al_3Fe$ intermetallic compound: Vanadium content is 3.6% and iron content is 39%. The major slag components were aluminum, calcium, and silicon (originating from both ash and flux), and less than 0.5% (total) of vanadium and iron not extracted (reduced). Aluminum, silicon, and calcium originate from the scrap and flux.

The ferrovanadium alloy 25 and top slag 24 are tapped by tilting the smelter or, in a continuously-operating furnace, bottom tapped at opposite ends of a channel type furnace. Temperature of the process off-gas is moderated in the shaft by heat exchange with the pellets, and finally by a water quench at station 21. Carry-over particulates are separated in the hot baghouse 22 and recirculated into the pelletizer 23. Additional energy savings can be realized by extracting heat from the hot (granulated) slag, which constitutes up to 90 wt % of molten products, and by in-plant (e.g., power station) utilization of the sensible heat left in the process gas leaving the shaft. The process can be continuous, or time-staged by varying the stoichiometry and ash or pellet charging to optimize the melting rate and then the reduction rate.

While FIG. 1 of the present drawing illustrates a preferred embodiment in which the gas burner tuyeres are fixed or supported for retractable extension through openings 26 in the roof portion 14 of the furnace, the burners 27 can be supported for extension into the heating space 13 through openings in the cylindrical side wall of the furnace. The gas burners in the side wall and/or roof portion of the furnace wall preferably are supported for adjustable extension into the heating space 13 of the furnace so that they can be fixed in positions above the upper surface of the slag layer, and can accommodate metal pools 25 and slag layers 24 of different depths.

It will be apparent to those skilled in the art that the present furnace system enables full utilization of natural gas or other caloric fuels and mixtures thereof with oxygen or oxygen-enriched air for the melting of particles 17 which may include ferrous scrap metals such as steel, with recovery of ash fines from the off-gases and/or optional recovery of a substantial portion of the normally-lost heat and/or steam for purposes related to the economy of the system.

Substituting electric energy conventionally used in ferroalloy furnaces with the combination of two less expensive energy sources (natural gas and coal) substantially reduces the cost of ferrovanadium production. The energy savings can be further increased when sensible heat and latent heat of water vapors in the furnace exhaust are recovered and utilized for feed drying and preheating, and/or for power generating purposes either by hot gas recirculating into the main boiler of the power station or by means of an auxiliary turbogenerator.

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

We claim:

1. Smelting process for recovering vanadium in the form of ferrovanadium alloy, from ashes containing vanadium oxides and a carbon source while rendering said ashes safer for disposal, comprising the steps of:
   (a) feeding said ashes into a molten slag layer covering a pool containing molten iron;
   (b) impinging fuel jets against the surface of the slag layer to heat and circulate the slag layer and to burn the carbon present in the ashes, to reduce the vanadium oxides and produce a pool of ferrovanadium alloy covered by the layer of the slag containing the ash residue, and
   (c) withdrawing the molten ferrovanadium alloy.

2. Process according to claim 1 in which the ashes of step (a) comprise pellets formed by a pelletizing a mixture of a major amount by weight of said ashes, from about 5% to 20% by weight of particulate coal and up to about 10% by weight of a binder material.

3. Process according to claim 2 comprising feeding the pellets in step (a) through a vertical preheating shaft against the flow of hot combustion gases from the slag layer, to preheat said pellets.

4. Process according to claim 1 in which pieces of scrap iron are fed with said ashes in step (a).

5. Process according to claim 1 in which the molten slag layer of step (b) comprises oxides of silicon, calcium and aluminum.

6. Process according to claim 5 in which the vanadium oxides are reduced to vanadium metal by reaction with alumina.

7. Process according to claim 6 in which the vanadium metal is protected by the molten slag layer against oxidation by the fuel jet.

8. Process according to claim 1 in which the vanadium oxides are reduced to vanadium metal by reaction with the carbon.

9. Process according to claim 8 in which the vanadium oxides are deduced by reaction with the carbon in the slag layer.

10. Process according to claim 8 in which the vanadium oxides are reduced by reaction with the carbon in the pool of molten iron.

11. Process according to claim 8 in which the vanadium oxides are reduced by reaction with the carbon in the slag layer and the pool of molten iron.

12. Process according to claim 8 in which the vanadium metal is protected by the molten slag layer against oxidation by the fuel jets.

13. Process according to claim 1 in which said ashes contain a high water content, comprising heating to partially dry said ashes, and feeding said ashes through a vertical preheating shaft into said slag layer.

14. Process according to claim 1 in which said ashes contain a high water content, comprising heating to dry said ashes, and feeding said ashes through a conduit terminating under the surface of said slag layer.

15. A smelting furnace for recovering vanadium, in the form of ferrovanadium alloy, from ashes containing vanadium oxides and a carbon source while rendering said ashes safer for disposal, comprising a refractory base enclosing a smelting chamber having a lower molten metal pool section, an intermediate slag layer section and an upper freeboard section, said refractory base having a roof portion which covers said smelting chamber and which communicates with a vertical shaft; means for feeding said ashes into an upper area or said vertical shaft and down into said smelting chamber; vent conduit means for withdrawing off-gases from an intermediate area of said vertical shaft, after said gases have preheated said ashes; fuel jet burners extending through openings in said refractory base and opening downwardly into said upper freeboard section for the heating and circulation of a slag layer present in said intermediate slag layer section, and means communicating with said lower molten metal pool section for withdrawing molten ferrovanadium alloy formed therein by the reduction of said vanadium oxides in the presence of molten iron.

16. A furnace according to claim 15 in which said refractory roof portion comprises said openings through which said burners extend into the freeboard section of the smelting chamber.

17. A furnace according to claim 15 in which said vent conduit means comprises a quenching means for cooling the off-gases.

18. A furnace according to claim 17 in which said quenching means is associated with a means for separating particulate materials from the cooled off-gases.

* * * * *